United States Patent [19]

Weston et al.

[11] Patent Number: 4,704,136
[45] Date of Patent: Nov. 3, 1987

[54] SULFATE REDUCTION PROCESS USEFUL IN COAL GASIFICATION

[75] Inventors: Charles W. Weston, Prairieville, La.; Frederick S. Mandel, Marinette, Wis.

[73] Assignee: Freeport-McMoRan Resource Partners, Limited Partnership, New Orleans, La.

[21] Appl. No.: 864,281

[22] Filed: May 16, 1986

Related U.S. Application Data

[63] Continuation-in-part of Ser. No. 617,258, Jun. 4, 1984, abandoned.

[51] Int. Cl.[4] .......................... C10J 3/00; C01B 17/44
[52] U.S. Cl. .................................... 48/197 R; 48/210; 423/415 A; 423/556; 423/DIG. 14
[58] Field of Search ............ 48/197 R, 210; 252/373; 423/415 R, 415 A, 566, DIG. 14

[56] References Cited

U.S. PATENT DOCUMENTS

| | | | |
|---|---|---|---|
| 616,391 | 12/1898 | DeBaranoff et al. | 423/566 |
| 1,492,810 | 5/1924 | Rossberg et al. | 423/566 |
| 1,640,314 | 8/1927 | Freeman | 423/566 |
| 1,916,803 | 7/1933 | Ley et al. | 423/566 |
| 3,640,682 | 2/1972 | Smith et al. | 423/566 |

OTHER PUBLICATIONS

White, J. F. M. and White A. A., "Manufacture of Sodium Sulfide", 28 Ind. and Eng. Chem., 244-246 (Feb. 1936).

Primary Examiner—Barry S. Richman
Assistant Examiner—Joye L. Woodard
Attorney, Agent, or Firm—Richards, Harris, Medlock & Andrews

[57] ABSTRACT

A carbonaceous material, such as coal, is gasified through the catalytic action of an alkali metal salt. The alkali metal is provided as a sulfate which is converted to a sulfide during gasification. In one embodiment, sodium sulfate is converted to sodium sulfide at a temperature effective to form a transitory melt condition at an interface which obtains coal gasification at relatively low temperatures and material residence times for the reaction. An alkaline earth sulfate, such as a gypsum, may be concurrently converted to a sulfide during gasification. The alkali metal sulfide may then be regenerated to a sulfate for process reuse while converting the alkaline earth to a carbonate for environmentally safe disposal with concurrent recovery of valuable sulfur. The evolved carbon gases may be used for fuel, for process feed chemicals, or the like.

33 Claims, 4 Drawing Figures

SULFATE REDUCTION PROCESS USEFUL IN COAL GASIFICATION

This application is a continuation-in-part of application Ser. No. 617,258 filed Jun. 4, 1984, now abandoned.

TECHNICAL FIELD

This invention relates to the reduction of alkaline earth metal sulfates and to gasification of coal and the like and sulfur recovery from calcium sulfate such as phosphogypsum and, more particularly, to coal gasification by reducing an alkali metal sulfate and an alkaline earth metal sulfate to corresponding metal sulfides during gasification and thereafter regenerating the alkali metal sulfate while recovering sulfur.

BACKGROUND ART

Phosphoric acid is formed in fertilizer production as an intermediate product useful in the manufacture of various end products, such as ammonium phosphate, triple superphosphate, and various solid and liquid mixed fertilizers. Phosphoric acid itself may be produced by the reaction of phosphate rock with sulfuric acid. During such a reaction, a by-product of calcium sulfate, either as gypsum, or a hemihydrate, is generated along with the phosphoric acid. Typically, about 2-3 tons of sulfuric acid, or the equivalent of nearly 1 ton of sulfur, are required to produce phosphoric acid having one ton of soluble $P_2O_5$ with concurrent production of about 6 tons of the by-product calcium sulfate, wet phosphogypsum.

The current practice of using sulfuric acid as a phosphate rock acidulant has a number of disadvantages. One major disadvantage is a dependence of the fertilizer industry on reasonably priced and readily available sulfur which is used in production of the sulfuric acid with which the phosphate rock is reacted. Sulfur production by the well known Frasch process is energy intensive and sulfur recovered by this process increases as fuel prices escalate. Higher energy prices also have resulted in the closing of older, less efficient sulfur mines, reducing the availability of domestically produced Frasch sulfur. Also, the known reserves of elemental sulfur suitable for Frasch mining are being depleted. Other sources of sulfur, such as sour natural gas, exist and may be utilized to some extent subject to price and availability.

A second disadvantage of the use of sulfuric acid for phosphate rock acidulation is the production of a large tonnage of calcium sulfate by-product, as noted above, usually in the form of gypsum containing residual acidity and other impurities. Although this by-product might be further processed to a useful form, the processing is practical only in a few geographical locations having uncommon economic conditions which justify the relatively large costs of producing useful products. Thus, the potential value of the gypsum may not generally be realized and its disposal presents a significant pollution control problem.

There are also advantages to recycling the sulfur normally discarded in the by-product calcium sulfate and several processes have been developed for this purpose. One such process, for example, is the Chemie Linz Gypsum-Sulfuric Acid Process. In this process, a mixture of calcium sulfate, sand, clay, flue ash and coke is fed to a rotary kiln, which may be fired using coal dust, fuel oil or natural gas. The clinker produced by the kiln is cooled and ground to cement. Sulfur dioxide-containing gas leaving the kiln is then cleaned, and a small amount of air is added in order to effect the oxidation of sulfur dioxide to sulfur trioxide in a catalytic converter at an $SO_2$ strength of about 6%-7%. The $SO_3$ thus produced is absorbed in water to produce sulfuric acid. Although such processes have been operated in commercial plants, several disadvantages arise: the quantity of fuel required to form the clinker, the high residence time required in the kiln (60-90 minutes), the co-production of large tonnages of by-product cement which must be sold or otherwise discarded, and the need for a sulfuric acid plant specifically designed to operate with a gas feed containing only 6%-7% $SO_2$.

Another process produces sulfur dioxide and lime (CaO) from calcium sulfate. Calcium sulfate particles are heated at about 1200° C. in the presence of reducing gases for 1 to 2 hours; the evolved sulfur dioxide is cooled, cleaned, and converted to sulfuric acid through a contact oxidation process followed by reaction with water. Lime is produced as a valuable by-product, but this process has some of the same disadvantages as clinker processes. In addition, the conversion is energy intensive, requiring about 7700 cubic feet of natural gas per ton of $H_2SO_4$ produced. Further, the sulfur dioxide feed to the sulfuric acid plant is still dilute (approximately 6%-7%), and thus cannot be used in a conventional plant designed to burn more concentrated sulfur without extensive modification. Finally, by-product calcium sulfate is not a preferred feed material because it is contaminated with fluorides and phosphates. In order to effectively utilize calcium sulfate from the most widely used phosphoric acid processes, it is necessary to remove impurities such as fluorides.

Conventional processes have been developed for the reduction of calcium sulfate to calcium sulfide. The reduction of $CaSO_4$ to $CaS$ is highly endothermic, requiring large amounts of fuel and high temperatures. One conventional process utilizes natural gas in an amount equivalent to 0.5 moles of carbon per mole of calcium sulfate. Oxygen is injected near the top of the bed in a reactor, forming sulfur dioxide. Calcium carbonate and calcium chloride are by-products. Another process uses coal, oil or natural gas to reduce calcium sulfate at a temperature of about 840° C. The calcium sulfide produced is reacted with water and carbon dioxide using the Chance process to yield hydrogen sulfide. The hydrogen sulfide can then be converted to sulfur through the Claus process, or burned directly in a conventional sulfuric acid plant.

Although the reduction of calcium sulfate to calcium sulfide proceeds more rapidly in the above process than the following process types, generally a reaction time of an hour or more is required to achieve reasonable conversion. In addition, the gypsum must first be heated for dehydration before being subjected to the reduction step.

As calcium sulfate can be reduced to calcium sulfide, other sulfates can be reduced to their corresponding sulfides. For many years most sodium sulfide was made by the reduction of salt-cake (sodium sulfate) using coal or coke. This reduction was carried out in furnaces at temperatures of over 980° C. Typically, 0.4 to 0.45 parts of reducing coal were required to reduce 1 part salt-cake. A complete reduction of the salt-cake generally required about 2.5 hours. Since reaction conditions were severe, the furnace brickwork suffered severe wear. Similarly, in yet another process, sodium sulfide was produced by reducing salt-cake with hydrogen at about 800° C. in brick-lined, insulated rotating kilns. Hydrogen was circulated through the kilns at a rate equal to 7 times the rate of hydrogen consumption.

Several of the processes outlined above for sulfate reduction by using coal also result in the formation of by-product gases. It should be noted that various alkali, alkaline earth and transition metal compounds have been found to be effective catalysts in the coal and coal char gasification reactions at the high temperatures discussed above. These effects may be important in reactions both on the coal surface and in the gas phase. The alkali metal compounds are effective catalysts for both the char-steam and the char-carbon dioxide reactions, while the alkaline earth metals such as calcium, are effective for the char-carbon dioxide reaction. Of the alkali metals, sodium and potassium have been found to be most effective catalysts if they are added in the form of carbonates; they are least effective as phosphates.

It has been observed that the activity of these materials increases as the amount of catalyst increases up to a "saturation point". Thus, it has been found that solutions of sodium or potassium carbonate catalyze the char-steam reaction at about 700° C. The rate of gasification was found to be roughly proportional to the concentration of potassium up to 15% based on the carbon content of the coal.

Notwithstanding the above technologies, there exists a need to convert the production of environmentally troublesome by-products, such as calcium sulfate, to useful materials or at least environmentally neutral materials.

This and other problems are overcome by the present invention wherein an improved process is provided for gasifying a carbon species and recoverying sulfur from a reduced sulfate while producing environmentally satisfactory results.

SUMMARY OF THE INVENTION

The present invention provides a method useful in producing process gases from a carbon species while converting an alkali metal sulfate and an alkaline earth sulfate to the corresponding sulfides at a temperature effective to produce a transitional melt phase in a reduced melting point system formed by the alkali metal sulfate and sulfide. Sulfur is recoverable from alkali and alkaline earth sulfides, while regenerating the alkali metal sulfate for reuse.

In carrying out the invention, a solid granular mixture is formulated of an alkaline earth metal sulfate, an alkali metal sulfate, and a solid carbonaceous fuel which functions as a reducing agent. The granular mixture is supplied to a reaction zone in which the alkali metal sulfate is reduced to the corresponding sulfide, forming a reduced melting point system with the sulfate. The reaction zone is operated at a temperature greater than the eutectic point of the alkali metal sulfate/sulfide system but less than the lower of the melting temperatures of the alkali metal sulfide and alkali metal sulfate. The granular mixture is maintained within the reaction zone for a period sufficient to convert a substantial portion, more than half and typically at least 80% of the alkaline earth metal and alkali metal sulfates to the corresponding sulfides.

Preferably, the molar ratio of the alkaline earth metal sulfate to alkali metal sulfate is within the range of 1:4–20:1 and the granular carbonaceous material is supplied in an amount to provide at least two moles of fixed carbon, i.e., carbon that is not volatilized under the reaction zone conditions, per mole of sulfate.

In one embodiment, an integrated process is obtained for combining phosphogypsum with a solid carbonaceous fuel such as coal, coke or lignite and employing an alkali metal sulfate as a catalyst to obtain a medium BTU synthetic gas and, thereafter, hydrogen sulfide, for further conversion to sulfur and/or sulfuric acid. This process occurs at substantially reduced temperatures and with significantly reduced residence times when compared with conventional processes for the gasification of coal. A catalytic reduction of a solid alkaline earth sulfate to a solid alkaline earth sulfide product is provided through a transient melt phase at the solid sulfate-solid sulfide interface of the system.

Many of the advantages of this invention will become apparent from the following detailed description wherein reference is made to the accompanying drawings.

DETAILED DESCRIPTION

Figure 1:
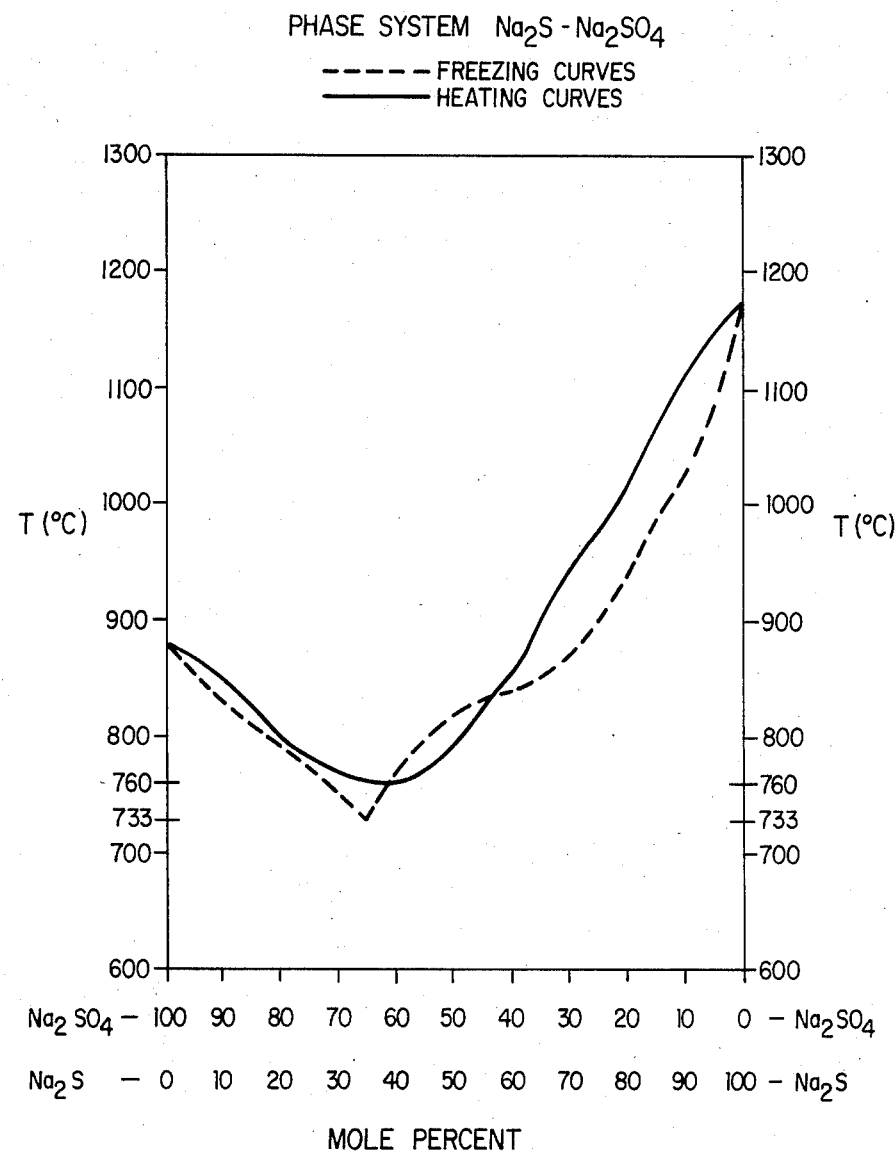
FIG. 1 is a phase diagram illustrating the sodium sulfide/sodium sulfate system.

By gasifying carbonaceous material in a reactor with an alkali metal sulfate, a reduced alkali metal sulfide may be formed in a melt with the alkali metal sulfate. The melt may, by ion exchange, transform an included alkaline earth metal sulfate to an alkaline earth metal sulfide. In one application, the alkali metal sulfate, the alkaline earth sulfate and a carbon species, for example "coal", are granulated or pelletized and then heated to at least the eutectic temperature of the alkali metal sulfate/sulfide system. The reactions, which occur simultaneously within the reactor to reduce the alkali metal and alkaline earth metal sulfates to the corresponding sulfides, may be characterized generally as involving the alkali metal and alkaline earth metal sulfates and the source of fixed carbon such as coal in an endothermic reaction to produce the alkali metal sulfide, residual alkaline earth metal sulfate, process gases including carbon oxide(s) and excess coal over that required for reduction, and, where coal is burned to provide heat for the reactor, that consumed in combustion. The alkali metal sulfide and the alkaline earth metal sulfate enter into an ion exchange reaction to produce the alkaline earth metal sulfide and alkali metal sulfate. The reaction processes continue as the solid mixture of solid sulfates, sulfides and reducing agent is transported through the reactor until the solid product is withdrawn. The solid product, of course, comprises primarily alkaline earth metal sulfide and alkali metal sulfide with residual amounts alkaline earth metal and alkali metal sulfates and char remaining from the carbonaceous material.

The foregoing sulfate, sulfide reactions may be summarized as follows:

$$M_2SO_4 + mSO_4 + 2C \rightarrow M_2S + mSO_4 + 2CO_2 \quad (1)$$

$$M_2S + mSO_4 \rightarrow M_2SO_4 + mS \quad (2)$$

wherein:

M is an alkali metal ion.

m is an alkaline earth metal ion

The carbon designated in equation (1) is, of course, the carbon provided by the coal or other carbonaceous fuel source. It will be recognized that a portion of the alkali metal sulfide produced in equation (1) enters into the ion exchange reaction depicted by equation (2) and is thereby regenerated within the granular system to provide additional alkali metal sulfate which is reduced to the alkali metal sulfide.

The process thus acts to gasify the carbon species while reducing both sulfate species to sulfides. The gas may be used directly to provide heat energy for the reduction/gasification reaction or may be additionally processed as feedstock for other thermal or chemical processes.

The resulting sulfides may then be processed to produce sulfur and to regenerate the alkali metal sulfate for reuse in the process. The processing to produce sulfur can use carbon dioxide, which may be conveniently separated from the "coal" gases, alkaline earth sulfate, and residual sulfides to produce hydrogen sulfide, alkaline earth metal carbonate, and alkali metal sulfate as follows:

$$M_2S + mS + mSO_4 + 2H_2O + 2CO_2 \rightarrow M_2SO_4 + 2mCO_3 + 2H_2S \quad (3)$$

where "M" and "m" are as described above with reference to reactions (1) and (2). The water on the lefthand side of reaction (3) may result from any suitable source such as quenching water used in cooling the reactor products, water produced by combustion, or where the alkaline earth metal sulfate is gypsum, the water of hydration associated therewith.

The H$_2$S may then be processed conventionally to sulfuric acid or to elemental sulfur in the Claus process.

In accordance with one embodiment of the present invention, calcium sulfate, such as gypsum or a hemihydrate from a phosphoric acid plant is the source of the alkaline earth sulfate and is reduced by coal or lignite to calcium sulfide with a concomitant production of a medium BTU synthesis gas. This process occurs at a temperature between 700° C. and 1000° C. in the presence of an alkali metal salt catalyst comprising a sodium, lithium or potassium salt and, if the salt is a sulfur containing species such as a sulfate or a sulfite, the catalyst is reduced to the corresponding sulfide. The reduction of the phosphogypsum and the alkali metal sulfate is essentially complete in 3 to 20 minutes.

Where the alkali metal salt is Na$_2$SO$_4$, the reaction is believed to be in accordance with the following equations:

$$CaSO_4 \cdot 2H_2O + Na_2SO_4 \rightarrow Na_2Ca(SO_4)_2 \cdot 2H_2O \quad (4)$$

$$Na_2Ca(SO_4)_2 \cdot 2H_2O \xrightarrow{\Delta} Na_2Ca(SO_4)_2 + 2H_2O \quad (5)$$

$$Na_2Ca(SO_4)_2 + 2C \rightarrow Na_2S + CaSO_4 + 2CO_2 \quad (6)$$

$$Na_2S + CaSO_4 \rightarrow Na_2SO_4 + CaS \quad (7)$$

$$Na_2SO_4 + CaS + 2C \rightarrow Na_2S + CaS + 2CO_2 \quad (8)$$

These equations illustrate one specific example. In general, calcium may be substituted with any corresponding alkaline earth metal, such as magnesium, barium or strontium, and sodium may be substituted by any alkali metal. However, because of economic considerations, in a preferred reaction, and as hereafter discussed, the alkali metal salt is potassium or sodium sulfate, preferably the latter, and the alkaline earth salt is calcium sulfate.

Formation of the double salt in accordance with reaction (4) is facilitated by the water of hydration of the gypsum, and in the preferred embodiment in which an aqueous solution of sodium sulfate is used in formulating the granular feed as described hereinafter, by the water of solution. The double salt hydrate is readily dehydrated at moderate temperature conditions, e.g. about 80° C., in accordance with equation (5) and then reduced at reaction zone conditions in accordance with equation (6). The compositing of the calcium sulfate and sodium sulfate in an aqueous medium to arrive at the double salt provides for intimate contact between the solid phases and the transition melt phase to cause the reduction and ion exchange reactions to proceed at a rapid rate.

As described in greater detail hereinafter, the eutectic temperature for the sodium sulfate/sulfide system is 760° C. at a molar composition of 67% Na$_2$SO$_4$ and 33% Na$_2$S. The melting points for Na$_2$SO$_4$ and Na$_2$S are 884° C. and 1180° C., respectively. For the potassium sulfate/potassium sulfide system the eutectic temperature is 610° C. at 23 mole % K$_2$SO$_4$ and 77 mole % K$_2$S and the melting points are 840° C. for the sulfide and 1069° C. for the sulfate. The alkali and alkaline earth metal sulfates are mixed in particulate form together with any suitable solid carbonaceous material such as coal, lignite, biomass and the like. The alkali metal sulfate, under the reaction conditions, is reduced to the corresponding alkali metal sulfide. The alkali metal sulfate and sulfide form a reduced melting point system having a eutectic point substantially below the melting point of either of the system's components, and the reduction and gasification reactions are carried out at a temperature between the eutectic point and the lower component melting point. In the case of calcium sulfate, sodium sulfate and coal, the relationship between the solid reactant components and the transitional melt phase existing between the solid sulfate, sulfide and coal surfaces, recalling that the reaction is carried out at a temperature above the eutectic point but below the sulfate and sulfide melting points, may be illustrated diagramatically as follows:

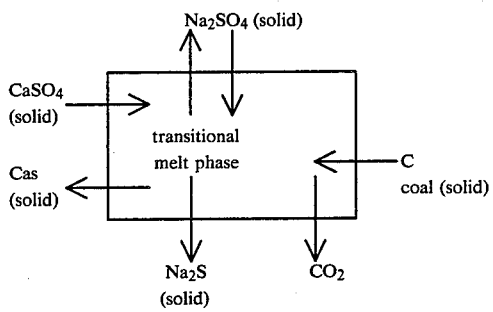

For a given portion of the reaction mass, the melt phase depicted above is transitory in the sense that it will exist only so long as there are solid sulfate and sulfide phases in contact with one another. Thus, considering a single granular system in isolation, the sodium sulfate will become "used up" in the reduction reaction to produce sodium sulfide and at some point there will be insufficient sodium sulfate to produce the melt phase at a temperature less than the melting point of sodium sulfate.

When an alkali metal sulfate salt is used, an alkali metal sulfide also may conveniently be added to the reaction mixture to facilitate formation of the melt phase at a lower temperature. More specifically, and as described in greater detail below, alkali metal sulfide produced in the reduction reaction may be withdrawn from the reaction zone and recycled to be added to the feed mixture supplied to the reaction zone. When the catalytic salt is sodium sulfate, the reduction of calcium sulfate to calcium sulfide is most conveniently carried out between two temperatures, viz. the melting point of the sodium sulfate catalyst (884° C.) and the melting or freezing point of the sodium sulfate/sulfide eutectic composition. As illustrated in FIG. 1, a eutectic melt is formed at about 760° C. when determined from a linear heating mode, and is found at 733° C. when determined from freezing point techniques; in both cases the eutectic point occurs at a mixture of about 67 mole % sodium sulfate and about 33 mole % sodium sulfide. In the present process, the melt phase of the sodium sulfate/sodium sulfide system enhances the generation and exchange of sodium sulfide for enhanced phosphogypsum reduction.

Therefore, the primary process involves the compounding and heating of intimate mixtures of sodium sulfate, gypsum and coal or lignite in order to facilitate, first, the reduction of sodium sulfate to sodium sulfide during coal gasification. The sodium sulfide will thereafter exchange with calcium sulfate to reform sodium sulfate, which can then be further reduced. The reduced alkali metal sulfide and alkaline earth sulfide may then be quenched in an aqueous medium including additional gypsum and carbon dioxide, as herein below discussed for equation (12). Sulfur recovery is obtained by generating hydrogen sulfide and the calcium waste is obtained as a substantially neutral carbonate.

Figure 2:
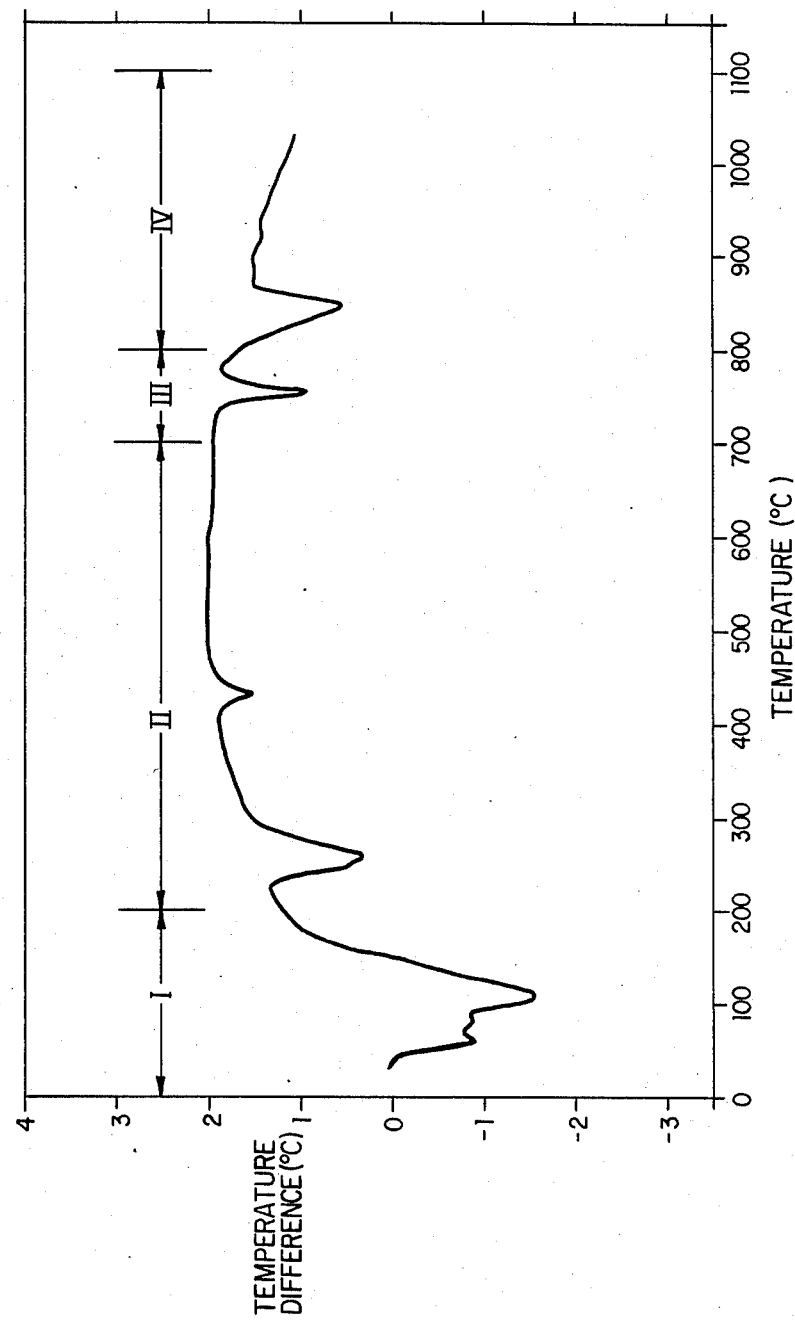
FIG. 2 is an illustrative differential thermal analysis of a mixture including sodium sulfide, sodium sulfate and calcium sulfide illustrating endothermic zones occurring in the process.

FIG. 2 demonstrates a typical differential thermogram illustrative of mixtures of sodium sulfide, sodium sulfate and calcium sulfide. Zone I (30° C.-220° C.) in the thermogram corresponds to the endothermic loss of water during initial heating of the sample. Zone I contains the peaks characteristic of water loss. Zone III (700°-800° C.) contains a strong endotherm corresponding to the eutectic melting (760° C.) shown in FIG. 1 of the two salt system. The endotherms in Zone IV show the melting of the remaining sodium sulfate.

The endothermic transition at 250° C. and within Zone II corresponds to a trigonal to hexagonal crystal morphology change characteristic of sodium sulfate. Zone II further illustrates an endotherm at about 425° C. which is the only characteristic effect of CaS on the system since CaS is not soluble in the eutectic system melt phase. The occurrence of CaS can be easily detected, however, by the appearance of the endotherm at about 425° C. in Zone II, characterisic of a CaS crystal structure change.

The addition of phosphogypsum, calcium sulfate-hemihydrate or calcium sulfate to the eutectic system of 0.30 M $Na_2S$/0.70 M $Na_2SO_4$ at a molar ratio of sodium to calcium equal to 2:1 eliminates the eutectic endotherm at Zone III (FIG. 2) and produces the characteristic endothermic melt transition for sodium sulfate in Zone IV. The disappearance of the melt phase and the appearance of the sodium sulfate demonstrate that the following ion exchange reaction sequence can occur:

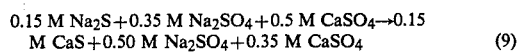

(9)

If the above sequence does describe the reaction system, a mixture can be made in which the ratio of sodium sulfide: sodium sulfate: calcium sulfate favors the formation of a eutectic point melt. For a mixture of 0.54 M sodium sulfate, 0.26 M sodium sulfide and 0.20 M calcium sulfate, experiments confirm the initial appearance of the eutectic point at 760° C. with slightly shifted sodium sulfate transition. The following equation illustrates the exchange:

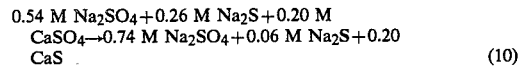

(10)

The above example also approximates the observed shift for a pure system comprised of 93% sodium sulfate and 7% sodium sulfide. That an exchange is indeed occurring between sodium sulfide and calcium sulfate, is shown by the reappearance of the sodium sulfate peak in Zone IV. If the ratio of sodium sulfide to calcium sulfate is further increased, the $Na_2S/Na_2SO_4$ eutectic transition becomes more evident.

The phase chemistry of the sodium sulfide/sodium sulfate system illustrated in FIG. 1 is of importance in regulating the reduction of the alkaline earth metal sulfate species. When a melt phase for the sodium sulfide/sodium sulfate system forms at or above the eutectic point (760° C.), the reaction rate increases markedly with temperature for both the reduction and gasification reactions involving the carbon source.

Figure 3:
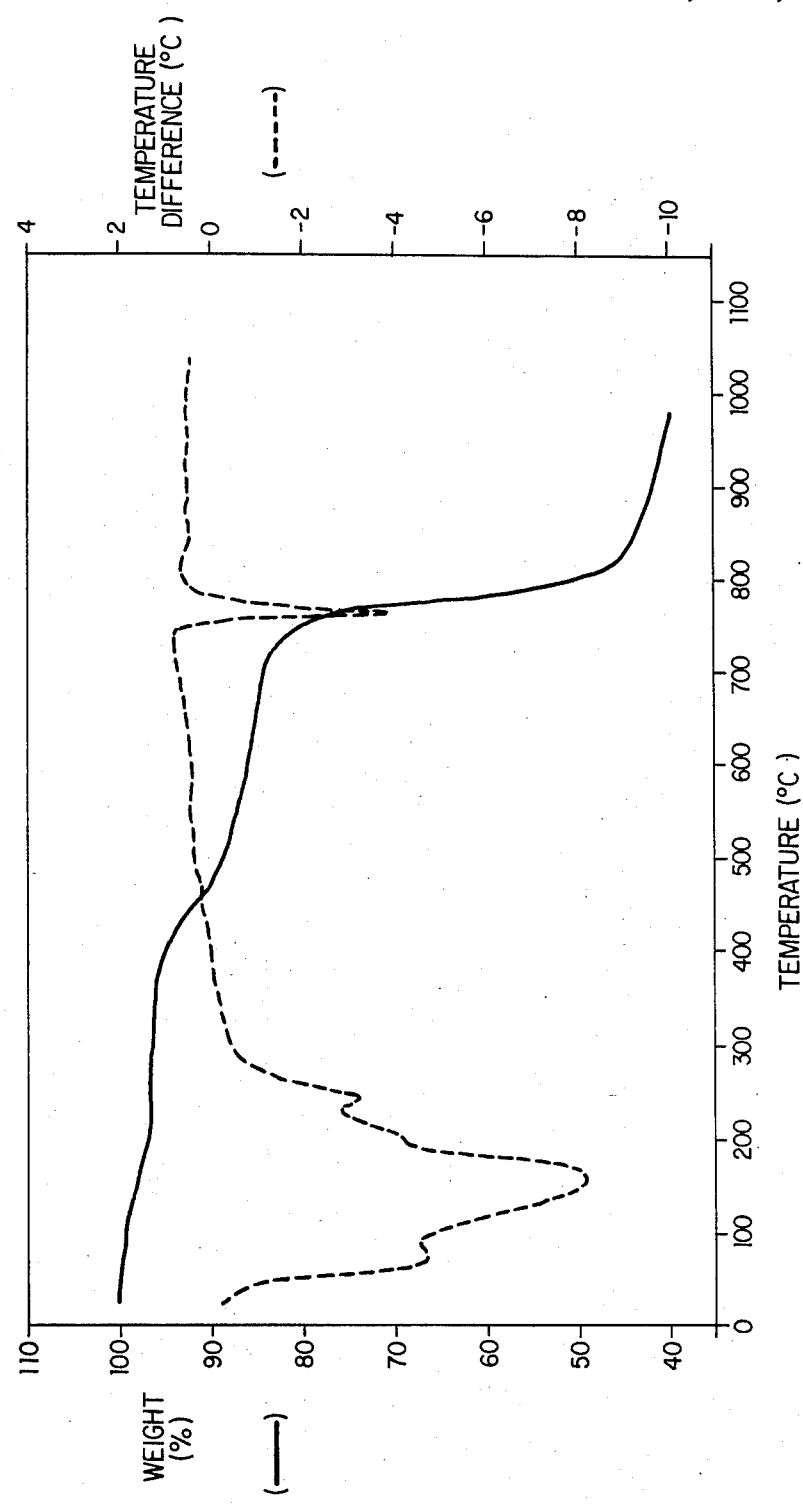
FIG. 3 is a combined differential thermal analysis and thermogravimetric analysis at the eutectic melting point of one mixture made using the invention.

FIG. 3 presents an overlay of a differential thermal analysis and a thermogravimetric analysis, showing the weight loss of a sodium sulfate, calcium sulfate, and coal mixture as the temperature is increased. In the eutectic region, the sulfide from the reduced sulfate species exchanges with the sulfate from phosphogypsum in accordance with equation (2) and the reduction proceeds in a facile manner. The present process promotes the unexpectedly rapid reduction of calcium sulfate to calcium sulfide because reduction of the sulfate to sulfide quickly occurs in the transitional melt phase of the sulfate/sulfide system. The sulfide thus formed then rapidly exchanges in an ion exchange mechanism with any unreacted calcium sulfate until essentially all sulfate is reduced. Thus, rather than a solid-solid interface, a liquid-solid interface is provided for intimate contact between the resulting reduced sulfide and the phosphogypsum during the exchange reaction.

Figure 4:
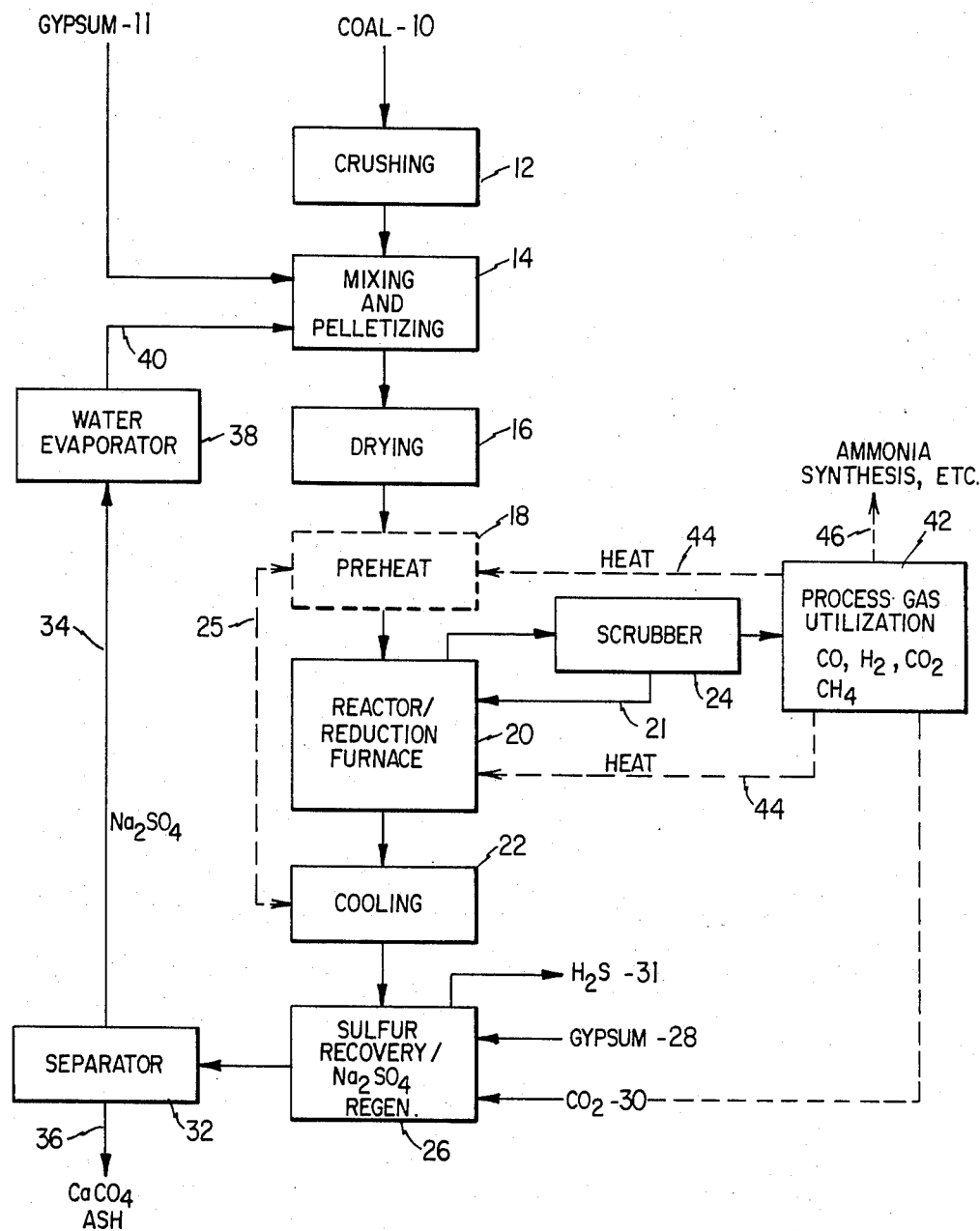
FIG. 4 is a block diagram illustrating process steps of the invention.

Referring now to FIG. 4, a process is disclosed for recovering sulfur from phosphogypsum, in which coal or lignite, an alkali metal sulfate catalyst and phosphogypsum are intimately mixed. Coal 10 is crushed 12 to a size such that about 50 to 95% by weight will pass through a 200 mesh U.S.S. sieve. The crushed coal is mixed 14 with phosphogypsum 11 and sodium sulfate solution 40, recycled as hereinbelow described, and processed 14 to form feed pellets, granules or powder. The pelletized or granulated material 14, which can range in size from −178 to +65 mesh, is dried 16 to about 0.2 to 2% free water. This mixture can be dried by heating with natural gas, powdered coal, fuel oil, or, according to a preferred embodiment, a portion of the synthesis gas generated when practicing the present process.

The ratio of coal 10 to gypsum 11 in the mixture depends upon the composition of the coal and the composition and amount of synthesis gas desired. Generally, however, this ratio can vary in a range from (1 to 2) to (4 to 1).

In terms of total sulfate, the coal (or other carbonaceous reductant) should be present in the amount to provide two moles of carbon for each mole of sulfate (whether in the form of alkali metal sulfate or alkaline earth metal sulfate) in the granular feed mixture. Preferably, the carbonaceous material will be present in an amount to provide at least two moles of fixed carbon, i.e. carbon which is not volatilized at the reaction zone temperature and pressure, for each mole of sulfate. If the energy supplied in the reactor to drive the reaction is supplied by a combustion of the coal, additional coal to satisfy the combustion requirements should also be supplied. Similar considerations also apply where a portion of the coal is utilized in the production of synthesis gas. Normally, the fixed carbon content of the carbonaceous material will be within the range of 2 to 6 moles of fixed carbon per mole of sulfate. Coals and other carbonaceous fuels, of course, will vary widely in carbon content depending on their source. A typical coal will normally contain between 70–90% total carbon. Of this carbon content, perhaps 60–70% will be fixed carbon which is not volatilized at the reaction conditions.

The optimum ratio of sodium sulfate 40 to gypsum 11 then depends upon the proportion and composition of the coal 10 chosen, upon the capacity of dryer 16, and upon the rate of reaction desired. However, this ratio can also vary in a range from about (1 to 2) to (4 to 1). Generally, in terms of molar amounts, the mole ratio of alkaline earth metal sulfate to alkali metal sulfate will fall within the range of 1:2–20:1. That is, in terms of metal ions, the ratio of calcium ions to sodium ions will range from 1:4–10:1. A greater amount of sodium sulfate is unnecessary and may lead to melting problems in the reactor and an amount below the aforementioned range normally will not be sufficient to have a substantial impact upon the sulfide production process. Optimum conditions normally appear at a calcium sulfate/sodium sulfate molar ratio of about 1:1.

The dried mixture of gypsum, sodium sulfate and coal may then be optionally preheated 18 and fed to a reduction furnace 20 in which the feed charge is heated 44, either directly or indirectly. The fuel used to heat the furnace can be natural gas, synthesis gas, fuel oil, coal or lignite. The temperature maintained in the furnace depends upon the composition of the feed, but generally will range from 690° C. to 910° C. in order to maintain the transitional melt phase. The type of furnace 20 used may be any one of several types which have conventionally been used for calcination or gasification.

The furnace or reactor 20 is operated in a continuous flow mode in which feed is continuously added as product is continuously withdrawn. The granular reaction mass may be moved through the reactor by any suitable technique employing reactor configurations such as fluidized bed, stratified bed, or moving grate. The residence time of the solid charged to the furnace 20 is only from 3 to 75 minutes, depending upon the reaction temperature and the composition of the feed, and preferably is in a range from 5 to 25 minutes and more preferably in a range from 5 to 15 minutes. During heating, the calcium sulfate is dehydrated and reduced to a calcium sulfide, while the sodium sulfate is reduced to sodium sulfide according to the reactions depicted in equations (4) through (8). At the same time that these reductions take place, the gasification of the coal is promoted by the presence of the sodium salts, yielding a synthesis gas containing principally $CO$, $H_2$, $CH_4$, and $CO_2$.

The exact composition of the synthesis gas produced by this process will depend upon the proportion of coal to calcium and sodium sulfates present in the reaction mixture, the type and configuration of the furnace, the residual moisture, both free and combined, in the reaction mixture, whether the furnace charge is heated directly or indirectly, or if oxygen, air or steam is added. However, at least 70 mole percent of the carbon content of the coal is utilized in the production of synthesis gas.

Generally, the proportion of the various components in the synthesis gas product will be about 45–55% of $CO$, 30–40% of $H_2$, 1–5% $CH_4$ and 5–15% of $CO_2$ by volume. The volume of the gas produced per ton of coal fed to the furnace will vary, depending upon the proportion of the other components mixed with the coal, but generally ranges from 35,000 to 80,000 SCF per ton of coal.

In another embodiment of the process according to the present invention, the reduction of calcium sulfate and the gasification of residual char and volatiles are carried out in separate steps of the process. In one application, the reduction is conducted in the presence of a hot recycled gas, which is added in such a way that it is possible to maintain a fluidized bed in one zone; a mixture of recycled gas and oxygen or air can be added similarly in a second zone.

Yet another embodiment of the process involves the continuous feed of a predetermined concentration of air or oxygen, which is added to the reactor 20 via mixing with the recycled gas stream or in a separate feed stream. In this process, the reduction of the sulfate species is conducted simultaneously with the gasification of coal char and coal volatiles. When conducted in this manner, the reaction demonstrates a continuous weight loss profile. The gas mixture exiting the reactor will contain entrained solid particles which are removed in scrubber 24 from the gas using conventional techniques, such as cyclone action or wet scrubbing. The solids thus removed can be returned via line 21 to the bulk of the solids in the furnace. Although various scrubbing liquids might be used, it is convenient to scrub these gases using recycled sodium sulfate solution. In this way, the entrained solid particles are removed, and the solution also absorbs heat to aid in the subsequent concentration of the solution.

Some of the scrubbed gas 42 can now conveniently be used, for example, as a fuel to heat 44 the dryer or the furnace. However, the gas can also be used as a valuable fuel or process feedstock 46. Possible fuel uses might be for steam or electrical power generation, and possible process uses might be for methanol or hydrocarbon synthesis after further appropriate processing. In a conventional fertilizer complex in which phosphoric acid is used to produce ammonium phosphate type fertilizers, it would be particularly appropriate to use the gas for ammonia synthesis through the Haber process.

In one process embodiment, the solid material removed from the furnace may consist principally of a mixture of sodium sulfide, calcium sulfide, and coal ash produced in accordance with equations (6), (7) and (8). The efficient reduction of both sodium and calcium sulfate during the short residence time of the improved process is unexpected in view of present sulfate reduction processes. According to the present invention, at least 50 mole percent of the initial sulfates are reduced to sulfides. As a practical matter, at least 80% of the initial sulfates can readily be reduced to sulfides at a residence time of 35 minutes or less, and it will usually be preferred to operate within this limitation. In fact, the process can be operated at sulfate conversion rates of over 90% while still retaining the residence time at a value of 50 minutes or less. This unexpectedly short residence time permits the use of smaller reactors than would otherwise be possible.

Sulfate conversion rates of at least 80% and preferably 90% or more can readily be achieved at the above-mentioned residence times by operating at temperatures only moderately above the sodium sulfate/sodium sulfide eutectic point, e.g. a temperature of about 770° C. The residence time necessary to achieve a desired sulfate conversion rate is indicated by equation (11):

$$t = \frac{-\ln(1-c)}{k} \tag{11}$$

wherein:
c is the fraction of sulfate converted
t is the residence time in minutes
k is the rate constant in minutes$^{-1}$ The rate constant k, of course, increases with temperature in accordance with the well-known Arrhenius equation. Thus, substantially lower residence times are possible at higher temperatures within the range between the eutectic temperature and the lower melting temperature of the sulfate-sulfide components. Within the preferred temperature range of 800°-840° C., sulfate conversion above 90% can readily be achieved at a residence time within the range of 5-25 minutes, and usually within 5-15 minutes.

The reduction reaction is not affected by pressure and the reactor 20 may be operated at any suitable pressure ranging from atmospheric up to about 45 atmospheres or even higher. Depending upon the use to which process gas from the reactor 20 is to be put, it may be desirable to operate the reactor furnace at an elevated pressure within the range of about 25-45 atmospheres. For example, where the process gas is to be used in ammonia synthesis plants which typically are operated at about 400-600 psig, operating the reactor 20 within the aforementioned range will greatly reduce the capital and operating expenses associated with compressing the synthesis gas.

The furnace residue is quenched in cooling zone 22 and the resulting mixture may be pumped to a combined precipitation and sodium sulfate regeneration reactor 26. At this point, if it is desired to recycle sodium sulfide feed to the reactor, a portion of the sodium sulfide is recovered from the cooled mixture prior to passing it to the regeneration reactor 26. The sodium sulfide may be recycled by simply pumping a portion of the quenched furnace residue to the reduction reactor 20. Usually, however, it will be preferred to pump a portion of the quenched residue to the granular feed preparation stage 14. Carbon dioxide 30 and additional gypsum 28 are added to reactor 26 in order to convert the majority of the calcium compounds to a disposable calcium carbonate while generating $H_2S$ for sulfur recovery. At the same time, the sodium compounds are transformed to soluble sodium compounds for reuse.

Although the amount of gypsum 28 and carbon dioxide 30 added to this reactor may vary as a function of the composition of the solids exiting the furnace, generally sufficient gypsum 28 must be added to effect the transformation of the majority of the sodium sulfide back to sodium sulfate. If insufficient gypsum 28 is added, part of the sodium sulfide will yield sodium carbonate or bicarbonate. Although the presence of carbonates is in no way harmful to the process, less sulfate will then be available for reduction to sulfide in subsequent processing.

Similarly, sufficient carbon dioxide 30 must be added to transform the majority of the calcium present in the reaction mixture to calcium carbonate. As these reactions proceed, the available calcium and sodium sulfides release sulfur as hydrogen sulfide 31. The hydrogen sulfide is stripped from the reaction mixture as a gas using any of several conventional techniques. The hydrogen sulfide gas can then be dried and burned directly in a conventional contact type sulfuric acid plant, or it can be processed first to elemental sulfur using the well known Claus process. The following illustration demonstrates the regeneration of sodium sulfate:

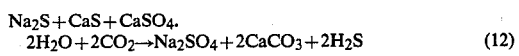
$$2H_2O + 2CO_2 \rightarrow Na_2SO_4 + 2CaCO_3 + 2H_2S \tag{12}$$

The necessity of stripping the hydrogen sulfide from the mixture may be mitigated in another process embodiment in which the reactor 20, as described below, is equipped with steam and carbon dioxide introduction at a process step effective to remove hydrogen sulfide in the off-gas stream.

Conditions in the precipitation reactor 26 will vary as a function of the composition of the solids fed to it. The temperature will generally vary from ambient to about 120° C., while the pressure will vary from ambient to about 10 atmospheres. The residence time of the solids in the reactor 26 will vary depending upon the composition of the solids, the average particle size, and the temperature of the slurry within the reactor. However, the residence time will generally range from 15 to 120 minutes.

After the hydrogen sulfide 31 has been stripped from the reactor slurry, the remaining material consists principally of a mixture of calcium carbonate and coal ash suspended in a sodium sulfate solution. While the material concentrations of the solution phase may be a function of precursor process conditions, the solution will typically contain 4% to 30% $Na_2SO_4$ by weight. The suspended solids are next separated 32 from the slurry in order to refine the sodium sulfate solution 34 for recycle. Separation 32 can be affected by a number of well known techniques, with either filtration or centrifugation being suitable. The solids 36 can also be washed to remove residual sodium sulfate and thereafter transported to a waste disposal area.

The disposable solid mixture 36 consists principally of calcium carbonate, which is an alkaline material. The mixture is resistant to the leaching of fluorides initially present in the phosphogypsum and of the various toxic heavy metals often present in coal ash. Thus by-product 36 is more stable and presents fewer environmental problems than either waste phosphogypsum or coal ash normally generated during coal gasification.

Sodium sulfate, sodium carbonate, or some other suitable sodium compound may be added to the filtrate 34 after solids removal in order to make up for sodium losses during processing. The sodium sulfate solution is then concentrated in evaporator 38 using conventional techniques to a 20% to 30% by weight sodium sulfate solution 40. Solution 40 is then recycled to the pelletizing or granulation step 14. Other suitable make-up materials replacing sodium sulfate include the following: a mixture of sodium sulfate and sodium carbonate; potassium sulfate; lithium sulfate or lithium carbonate; a mixture of potassium sulfate and potassium carbonate; a mixture of sodium and potassium sulfate; mineral syngenite, $CaK_2(SO_4)_2.H_2O$; mineral langbeinite, $Mg_2K_2(SO_4)_3$; mineral astrakenite, $Na_2Mg(SO_4)_2.4H_2O$; and mineral loweite, $Na_2Mg(SO_4)_2.5H_2O$. So long as water is present when a sodium salt such as sodium carbonate is mixed with the calcium sulfate, sodium ions will exchange with some of the calcium ions to form sodium sulfate for the sodium sulfate-sodium sulfide reduction reaction within the reaction furnace. The water necessary to facilitate such ion exchange during the compositing step may be supplied by the water of hydration of gypsum, although, as noted previously, a substantial amount of solution water normally will also be present. In addition, coal may include anthracitic, bituminous or lignitic coal, or derivative species such as coke or charcoal.

As noted previously, the process further permits the addition of steam and carbon dioxide which are added to maximize sulfur recovery by generating an off-gas stream rich in hydrogen sulfide. In this case the sulfate species may be reduced in an atmosphere rich in the coal gas, with or without oxygen or air, followed by the addition of steam and carbon dioxide to cause the evolution of hydrogen sulfide. In this embodiment of the invention, steam and carbon dioxide can be introduced into the reactor 20 or into admixture with the hot product from reactor 20 (prior to the quenching step) or both in order to generate hydrogen sulfide in accordance with the following reactions:

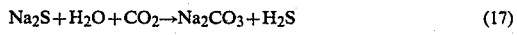
$$Na_2S + H_2O + CO_2 \rightarrow Na_2CO_3 + H_2S \quad (17)$$

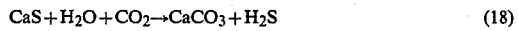
$$CaS + H_2O + CO_2 \rightarrow CaCO_3 + H_2S \quad (18)$$

Where reactor 20 is operated as a furnace, that is, where coal or other fuel is burned to provide the heat for the endothermic reduction reaction, the steam and carbon dioxide in the combustion products will cause some generation of hydrogen sulfide in accordance with reactions (17) and (18). By injecting additional steam and carbon dioxide into the furnace, reactions (17) and (18) will be driven further to the right with the increased production of hydrogen sulfide, thus minimizing the amount of hydrogen sulfide to be stripped from the sodium sulfate regenerator reactor 26. In addition to feeding steam and carbon dioxide to the furnace, these reactants may also be supplied to a second high temperature reaction zone which may be in a second reactor (not shown in FIG. 4) interposed between reactor 20 and cooling zone 22 or which may be a second post-reduction stage of reactor 20.

Subsequent to the removal of hydrogen sulfide from the reaction mixture, the solid product from the furnace (or the second reactor if such is used) is then cooled by quenching in an aqueous medium and gypsum is added in order to regenerate the sodium sulfate with the attendant production of calcium carbonate as follows:

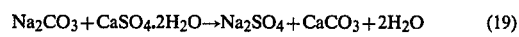
$$Na_2CO_3 + CaSO_4.2H_2O \rightarrow Na_2SO_4 + CaCO_3 + 2H_2O \quad (19)$$

The hydrogen sulfide laden synthesis gas is stripped of hydrogen sulfide via conventional techniques. The remaining coal char and residual sulfide is further processed by contact with an atmosphere of oxygen or air to generate heat by burning of the char and by the exothermic reoxidation of sulfide species, predominantly through the following reactions:

$$Na_2S + 2O_2 \rightarrow Na_2SO_4 \quad (20)$$

$$CaS + 2O_2 \rightarrow CaSO_4 \quad (21)$$

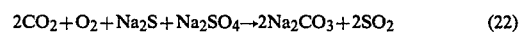
$$2CO_2 + O_2 + Na_2S + Na_2SO_4 \rightarrow 2Na_2CO_3 + 2SO_2 \quad (22)$$

The calcium carbonate generated in the regeneration of the alkali sulfate may be returned to the reactor via granulation or pelletization as a means of regulating the conversion of alkali sulfide or alkaline earth sulfide to hydrogen sulfide. Furthermore, the decomposition in the granule or pellet of calcium carbonate to calcium oxide and carbon dioxide provides for better utilization of chars.

The following examples demonstrate the operability of the above processes and application over a range of process conditions to achieve a variety of preselected results:

EXAMPLE 1

In order to demonstrate the reduction of sodium sulfate and calcium sulfate to their corresponding sulfides, equations (6), (7), (8), at an approximately 1:1 molar ratio and with the concomitant production of synthesis gas, the following materials were pan granulated in the following weight percents:

Coal—25.34%
Calcium sulfate dihydrate—41.68% (Phosphogypsum)
Sodium sulfate—32.98%

The mixture was then analyzed and had the following analysis:

% Total Organic Carbon—14.0%
% Calcium—8.1%
% Water Soluble Calcium—6.0%
% Sodium—10.1%
% Phosphorous Pentoxide—0.46%
% Total Sulfur—13.6%
% Sulfate—37.6%

% Sulfide—1.1%

The material was then dried at 70° C. for one hour to give a granular material with extremely good structural integrity. A wide distribution of material was separated on a sieve; however, most of the product was +12, −65 U.S.S. sieve.

The granulated mixture of coal, sodium sulfate and calcium sulfate was then introduced into a four inch fluid bed reactor via a forced gas feeder after establishing an initial bed with calcium oxide. Reactants were introduced through a drop-leg in the reactor as well as through a gravity feeder. The bed fluidization was maintained with a gas flow of 42-48 cfm, and with recycling the gases derived from the gasification of the coal in the granulated mixture. The temperature of the bed was maintained from 700° C. to 900° C., while residence time ranged from eight minutes to 45 minutes. Recycled gases were scrubbed with water and the gas flows were measured before return to the reactor. The gas composition was monitored with infrared gas analyzers and with gas chromatography.

Analysis of the gas produced during gasification of the coal in the mixture yielded the following composition:

| Component | Percent by Volume |
|---|---|
| Methane | 2 |
| Hydrogen | 34 |
| Carbon Monoxide | 53 |
| Water | 1 |
| Carbon Dioxide | 11 |

After gasification was completed the reduced granular mixture had the following composition:

Analysis

% Total Carbon—2.7%
% Calcium—28.5%
% Water Soluble Calcium—6.2%
% Sodium—6.3%
% Phosphorous Pentoxide—0.27%
% Total Sulfur—8.3%
% Sulfate—1.68%
% Sulfide—7.7%

The efficiency of the sulfate to sulfide conversion is shown by the following analysis of the process constituents at various process points

|  |  | Assay % | Weight g | Distr. % |
|---|---|---|---|---|
| In-Feed | $S_{Total}$ | 13.6 | 314.6 | — |
|  | $SO_4^{2-}$ | 12.5 | 289.1 | 91.9 |
|  | $S^{2-}$ 1.1 | 25.4 | 8.1 |  |
| Out-Final Bed | $S_{Total}$ | 8.3 | 148.0 | — |
|  | $SO_4^{2-}$ | 0.6 | 10.7 | 7.2 |
|  | $S^{2-}$ 7.7 | 137.3 | 92.8 |  |
| Bed Overflow | $S_{Total}$ | 8.3 | 20.7 | — |
|  | $SO_4^{2-}$ | 0.1 | 0.3 | 1.0 |
|  | $S^{2-}$ 8.2 | 20.4 | 99.0 |  |
| Cyclone comp. | $S_{Total}$ | 12.0 | 15.1 | — |
|  | $SO_4^{2-}$ | 1.4 | 1.8 | 11.9 |
|  | $S^{2-}$ 10.6 | 13.4 | 88.1 |  |

The total of the gas rate per ton of coal was about 71,870 SCF/ton or 2,752,617 SCF/hr., with the total number of moles of gas being produced per ton mole of coal as follows:

|  | Moles |
|---|---|
| Methane | .128 |
| Hydrogen | 78.687 |
| Water | 9.983 |
| Carbon Monoxide | 97.675 |
| Carbon Dioxide | 10.781 |

The results demonstrate excellent sulfate conversion with the sulfides increasing from 8.1% to 92.8%, high carbon utilization with granular carbon decreasing from 14.0% to 2.7% and the concurrent production of a medium BTU synthesis gas of about 246 BTU per SCF.

EXAMPLE 2

In order to demonstrate an effective range within which a pan granulated mixture will undergo the reduction of sulfate to sulfide and yield a synthesis gas, the following mixture by weight percents was agglomerated according to Example 1 in a ratio of 4:1 ($Na_2SO_4$ to $CaSO_4.2H_2O$):

Coal—43.14%
Calcium Sulfate Dihydrate—13.65%
Sodium Sulfate—43.21% and possessed the following elemental analysis:

% Total Organic Carbon—23.5%
% Calcium—2.9%
% Water Soluble Calcium—2.8%
% Sodium—13.5%
% Phosphorous Pentoxide—0.11%
% Total Sulphur—12.0%
% Sulfate—33.7%
% Sulfide—0.8%

The granular mixture was introduced to a fluid bed reactor in the manner of Example 1 with the following off-gas analysis:

| Component | Percent by Volume |
|---|---|
| Methane | 6 |
| Hydrogen | 33 |
| Water | 2 |
| Carbon Monoxide | 46 |
| Carbon Dioxide | 13 |

The reduced granular mixture had the following composition:

Total Organic Carbon — 5.3%
Calcium—20.2%
Water Soluble Calcium — 0.73%
Sodium—16.0%
Phosphorous Pentoxide—0.49%
Total Sulfur—18.5%
Sulfate—1.08%
Sulfide—18.1%

The sulfate to sulfide conversion efficiency is again demonstrated:

|  |  | Assay % | Weight g | Distr. % |
|---|---|---|---|---|
| In-feed | $S_{Total}$ | 12.0 | 240 | — |
|  | $SO_4^{2-}$ | 11.2 | 224 | 93.4 |
|  | $S^{2-}$ | 0.8 | 16 | 6.6 |
| Starting Bed | $S_{Total}$ | 8.3 | 145.9 | — |
|  | $SO_4^{2-}$ | 0.6 | 10.5 | 7.2 |
|  | $S^{2-}$ | 7.7 | 135.4 | 92.8 |
| Out Bed Comp | $S_{Total}$ | 19.3 | 426 | — |
|  | $SO_4^{2-}$ | 0.6 | 13.0 | 3.1 |
|  | $S^{2-}$ | 18.7 | 412.7 | 96.9 |

|  |  | Assay % | Weight g | Distr. % |
|---|---|---|---|---|
| Baghouse | $S_{Total}$ | 10.5 | 9.9 | — |
| and | $SO_4{}^{S-}$ | 0.9 | 0.8 | 8.1 |
| cyclone | $S^{2-}$ | 9.6 | 9.1 | 91.9 |

The overall percent reduction of sulfate species was 94%.

For this mixture the off-gas production was about 41,326 SCF/ton at a rate of 5,289,697 SCF/Hr. The moles of product gases per ton mole of coal became the following:

|  | Moles |
|---|---|
| Methane | 27.27 |
| Hydrogen | 3.60 |
| Carbon Monoxide | 81.30 |
| Carbon Dioxide | $4.23 \times 10^{-3}$ |
| Water | $1.47 \times 10^{-4}$ |

The heating value of this resulting gas is about 325 BTU per SCF.

Thus, the desired reaction took place with a 4:1 ratio by weight of sodium sulfate to gypsum. In addition the mixture contained a higher weight ratio of coal.

EXAMPLE 3

In order to examine the effects of the method of granule production on the process outputs, an intensive mixing pin mill pelletizing device was used as a means of agglomeration. The following mixture was prepared:
Coal—29.19%
Calcium Sulfate Dihydrate—41.58%
Sodium Sulfate—29.23%

The wet, pin-milled material was then dried at 70° C. for one hour to give a granular material having a residual moisture of 0.7% with the following starting elemental analysis:
Total Carbon—19.2%
Calcium—11.4%
Sodium—11.3%
Total Sulfur—16.5%

The material was screened using U.S.S. sieves to give a following size distribution of $+10-56.02\%$; $-10, +65-32.23\%$; $-65-12.05\%$.

This pin-milled and dried mixture of coal, sodium sulfate and phosphogypsum was then introduced into a four-inch diameter fluid bed reactor using a forced gas feeder after an initial bed of devolatized feed was established. The reactant mixture was introduced through the top of the reactor. Fluidization of the bed was maintained with a gas flow of from 30 to 48 cfm with gas derived from the gasification of the coal fraction of the feed mixture. The temperature of the bed was controlled to maintain a temperature in a range from 675° C. to 900° C., with a residence time of solids in the reactor from 15 to 73 minutes, for a feed rate of 4.75 lbs of feed per hour. The recycled gases were preheated to 600° C. after being scrubbed with water. The gas flow and composition were determined before return to the reactor.

The gas derived from the gasification of the coal yielded the following analysis:

| Component | Percent by Volume |
|---|---|
| Methane | 0.05% |
| Hydrogen | 30.67% |
| Carbon Monoxide | 31.90% |
| Carbon Dioxide | 30.45% |
| Hydrogen Sulfide | 1.47% |
| Nitrogen | 0.47% |
| Water | 5% |

Calcined solids were discharged from the reactor having an analysis of 29% sulfide and 8.5% carbonate, with an overall sulfate conversion of 98%. The gas produced had a calorific value of 212 BTU/SCF with 83,046 SCF of gas per ton of coal.

After establishing a constant operating rate at the above conditions, air was then introduced into the recycle gas stream at a rate of 0.65 SCFM. The gas produced under these new conditions contained 34% CO, 12% $CO_2$ and 16.9% hydrogen by volume, with the balance being methane, nitrogen, hydrogen sulfide and water. The resulting calcine had the following composition:
Total Carbon—9.48%
Total Sulfide—25.4%
Total Sulfate—1.08%
Calcium—21.6%
Sodium—19.6%
Carbonate—4.8%

The results indicate that this significant change in pellet production method does not generally affect the overall process, which continued to obtain significant sulfate reduction, coal utilization and concomitant gas production.

EXAMPLE 4

Pin-milled particles were then made with yet another ratio of sodium sulfate to calcium sulfate to coal. The following mixture was pelletized: 24.08% coal, 44.58% phosphogypsum and 31.43% sodium sulfate.

The mixture was then dried and process in the fluid bed reactor as described in Example 3. Analysis of the resulting products showed that 98% of the input sulfate was converted to sulfide, while the off-gas contained 1.593% by volume hydrogen sulfide and had a heating valve of about 235 BTU/SCF with comparable carbon utilization.

EXAMPLE 5

Yet another variation in the ratio of coal: sodium sulfate: $CaSO_4.2H_2O$ in pin-milled feed material was made. The feed was generally prepared as described for Example 3 and had the following analysis: 22.23% coal, 43.33% phosphogypsum, and 34.44% sodium sulfate. Output product analysis showed that 96% of the sulfate was converted to sulfide while the off-gas contained 1.66% by volume hydrogen sulfide and had a heating value of about 217 BTU/SCF.

EXAMPLE 6

Feed material was prepared as described for Example 3 but having a ratio of sodium sulfate to gypsum of 4:1.

The feed analysis showed 32.93% coal, 16.05% phosphogypsum, and 51.02% sodium sulfate. The product off-gas contained 1.463% by volume hydrogen sulfide and had a heating value of about 287 BTU/SCF. The conversion of sulfate to sulfide was indicated to be about 99%.

EXAMPLE 7

A reaction was obtained according to the process of Example 3. The coal ratio was raised while the sodium sulfate to gypsum ratio was kept at 4:1 to determine the effect of higher coal ratios on the production of synthesis gases. Feed material was prepared as described for Example 4 with the following analyses: 38.97% coal, 14.60% phosphogypsum, and 46.43% sodium sulfate. The process product analysis show a 94% conversion of the reported sulfide, with an off-gas having 1.341% hydrogen sulfide by volume, and a heating value of about 307 BTU/SCF.

EXAMPLE 8

A reaction was obtained according to the process of Example 3. The ratio of sodium sulfate to gypsum was now changed to 1:4 and the process products were analyzed. The feed composition was 35.80% coal, 53.68% phosphogypsum, and 10.52% sodium sulfate. The process off-gas contained 1.322% by volume hydrogen sulfide and had a heating value of about 294 BTU/SCF. Process products showed a reduced conversion of sulfate to sulfide of 89%.

EXAMPLE 9

As an intermediate case, the sulfate to gypsum ratio was established at 1:1 with a relatively high coal ratio. The feed material was prepared as for Example 4 and composed of 37.38% coal, 35.11% gypsum, and 27.52% sodium sulfate. In this case, 98% of the reported sulfate was converted to sulfide and the process off-gas contained 1.34% hydrogen sulfide by volume and had a heating value of about 300 BTU/SCF.

EXAMPLE 10

To demonstrate that only a short residence time is required to reduce the sulfate species according to the present process, several batch tests were performed in a four inch fluidized bed reactor. For each test the reactor was preheated to the desired temperature before adding the batch comprising 500 grams of feed material. Fluidization gas was prepared having an analysis of the actual analysis of off-gas compositions. This gas was recycled through the reactor during each test along with actual off-gas. Eight minutes after each batch was added to the reactor the reactor heating elements were switched off. The remaining solids in the reactor were immediately dumped into a nitrogen purged canister and cooled in a water bath.

Batch tests run at 385° C. and 585° C. produced measured sulfate conversions of less than 3%. Batch tests run at 640° C. and 741° C., however, showed a dramatic increase in conversion of 33% and 55%, respectively. These tests demonstrate that reaction rates greatly increase at temperatures above about 593° C.

EXAMPLE 11

An input mixture was formed based on the economic analysis of the input and the process products to determine the effects of continuous process parameters, particularly including a forced air feed. The reactor was brought to 780° C. and the mixture was introduced as a single batch. After 20 minutes the gases were turned off and a nitrogen purge was introduced.

A mixture of 54.41% coal, 25.66% phosphogypsum and 20.0% sodium sulfate was charged to a one inch fluidized reactor heated to 780° C., with a recycle gas composition as follows: 23.2% $H_2$, 6.5% $CO_2$, 6.01% $O_2$, 28.6% $N_2$ and 34.5% CO. The sample batch was reacted for 20 minutes under a continuous feed of air into the recycle gases. The off-gas produced during the reaction included a stream of gas 3 to 5% hydrogen sulfide as monitored by gas chromatography. The calcined solid product was analyzed and contained 30.34% sulfide with a weight loss of 68.4%, during the reaction, with 80% utilization of the input carbon.

EXAMPLE 12

The air feed to the reactor was doubled in an attempt to attain an improved thermal balance and carbon utilization with a one stage continuous feed of air.

After heating a one-inch fluidized bed reactor to 780° C., a sample prepared as in Example 11 was charged to the reactor. During this run a recycle gas was again injected into the reactor with about the following composition: 10.2% $H_2$, 5.2% $CO_2$, 48% $N_2$ 12.8% $O_2$ and 23.8% CO.

The sample was given 20 minutes for reaction as in Example 11, at which time the reactor is turned off and the sample purged with nitrogen. An increased carbon utilization of 96% was obtained.

EXAMPLE 13

A two stage process was simulated where stage 1 was conducted only in a reducing atmosphere and a temperature of 760° C. At stage 2 the temperature was rapidly increased to 820° C. and air was introduced with the recyle gas.

An input mixture was formed as in Example 11 was introduced to a one inch fluid bed reactor heated to 760° C. with the following recycle gas compositions: 28.3% $H_2$, 4.0% $CO_2$ and 67.7% CO. After eight minutes, compressed air was introduced into the recycle gas stream at about 25% by volume and the temperature was brought to 820° C. for 10 minutes. Product analysis for this simulated two stage calcination indicated nearly 5% hydrogen sulfide in the gas stream, with a calcine solids analysis of 19.1% sulfide and with a carbon utilization of about 93.4%.

The carbon utilization and sulfate conversion demonstrated the feasibility of a continuous and efficient process.

EXAMPLE 14

The stripping of $H_2S$ by the addition of $CO_2$ and steam according to the reactions of equations (13) and (14) was demonstrated.

A sample as in Example 11 was introduced into a one inch fluid bed reactor which was heated to 760° C. and receiving a recycle gas containing introduced air. After the sample was introduced, reaction was maintained for twenty minutes. Thereafter, carbon dioxide and water were introduced to the reactor. Process off-gas analysis then showed a 7% level of hydrogen sulfide. Analysis of the calcine solid demonstrated that only 8.6% residual sulfide remained.

EXAMPLE 15

Next, the reaction was conducted in an oxygen-containing recycle stream, after which steam and $CO_2$ were added. Furthermore, after stripping the $H_2S$, the residual sulfide was burned by the further addition of oxygen. This reaction became exothermic and indicated the possibility of obtaining a method which gains energy and provides a better thermal balance.

The following equations are believed to describe this exothermic condition where the reactions described by equations 17-19 are highly exothermic.

$$[Na_2SO_4 \cdot CaSO_4] + \text{"coal"} \quad (23)$$

(in presence of $O_2$)

$$\rightarrow Na_2S + CaS + 4CO_2 + \text{volatiles}$$

$$Na_2S + CaS + (2 - x - y) H_2O + (2 - x - y) CO_2 \quad (24)$$

$$\rightarrow (1 - x)Na_2CO_3 + (1 - y)CaCO_3 + xNa_2S + y CaS$$

$$+ (2 - x - y) H_2S$$

$$xNa_2S + 2(x)O_2 \rightarrow xNa_2SO_4 \quad (25)$$

$$yCaS + 2(y)O_2 \rightarrow yCaSO_4$$

As in Example 11, after the introduction of carbon dioxide and water vapor to the reactor, the flow of all recycle gases was terminated and the air level increased to a 1:2 stochiometric ratio of air to carbon dioxide. The reaction became exothermic as indicated by a large increase in the reactor temperature. The analysis of the calcine solid showed no residual sulfide.

EXAMPLE 16

Materials other than coal may be used to obtain the carbon input. Pellets were prepared according to Example 1 using 67.43% lignite, 18.26% phosphogypsum and 14.31% sodium sulfate. The material was dried at 70° C. and the product between +12, −65 U.S.S. sieve was separated. The granulated mixture of lignite, sodium sulfate and phosphogypsum was then charged to a one inch fluid bed reactor under the conditions of Example 11. The results were comparable to the results obtained using coal.

EXAMPLE 17

Sodium sulfate was regenerated from sodium sulfide according to equation (12), further recovering sulfur and producing an inert alkaline earth carbonate.

A 250 gram sample of the bed overflow from Example 3 was charged to a four liter stirred, jacketed pressure reactor. Overflow material added had the following analysis: 0.80% $P_2O_5$, 2.10% Fe, 0.70% Al, 16.70% Ca, 18.40% Na, 3.2% $SO_4$, 19.4% $S^{2-}$ and 7% $CO_3^{2-}$. Thereafter, 289.69 g of phosphogypsum and 1000 ml of water were added. The system was brought under a carbon dioxide pressure of three atmospheres and a flow rate of 8 SCFM. The solution was brought to 70° C. and reacted for one hour. The pH of the reaction mixture decreased from 13.4 to a final value of 7.6.

The reaction was stopped at the end of one hour and the mixture was filtered and washed under a 15 inch Hg vacuum through an 18 cm Buchner funnel. The filter cake weighed 679 g, of which 41.8% of the weight was moisture. The filtration time was 65 seconds. Analysis of the cake showed the following: 0.56% $P_2O_5$, 0.59% Fe, 0.26% Al, 14.97% $Ca^{2+}$, 1.47% $Na^+$, 13.82% $SO_4^{2-}$, 0% $S^{2-}$, and 21.84% $CO_3^{2-}$. Analysis of the filtrate showed the following: $7\times10^{31}$ 3% $P_2O_5$, $3\times10^{-4}$% Fe, $2\times10^{-4}$% Al, 0.08% Ca, 3.06% Na, 7.29% $SO_4^{2-}$, 0% $S^{2-}$ and 0.24% $CO_3^{2-}$. The collected wash (2040 ml) possessed similar analysis for $P_2O_5$, Fe, Al, Ca and differed in sodium (0.74%) and sulfate (1.51%). The recoveries of sodium and calcium were of the order of 100%, and the calculated amount of recovered sodium sulfate demonstrated a conversion of 99 to 100% of the theoretically predicted product.

EXAMPLE 18

The process of Example 17 was repeated where the calcine was subjected to three hours reaction with $CO_2$, $H_2S$ and water at 70° C. and a pressure of three atmospheres of $CO_2$ at a flow rate of $CO_2$ of 23 SCFM. The conversion results with the increased $CO_2$ flow rate were substantially identical with the results of Example 17.

Having described specific embodiments of the present invention, it will be understood that modification thereof may be suggested to those skilled in the art, and it is intended to cover all such modifications as fall within the scope of the appended claims.

What is claimed is:

1. A method for reducing an alkaline earth metal sulfate, the steps comprising:
    (a) supplying to a reaction zone a granular mixture of said alkaline earth metal sulfate, a solid carbonaceous reducing agent and an alkali metal sulfate which at the conditions within said reaction zone is subject to reduction to the corresponding alkali metal sulfide which forms a reduced melting point system with said alkali metal sulfate;
    (b) within said reaction zone, maintaining said granular mixture of said alkaline earth metal sulfate and said alkali metal sulfate in the presence of said reducing agent under reaction conditions to cause the reduction of said alkali metal sulfate to the corresponding alkali metal sulfide; and
    (c) operating said reaction zone at a temperature greater than the eutectic point of said alkali metal sulfate/alkali metal sulfide reduced melting point system and less than the lower of the melting temperatures of said alkali metal sulfate and said alkali metal sulfide to convert said alkaline earth metal sulfate to the corresponding alkaline metal sulfide.

2. The method of claim 1 wherein the molar ratio of alkaline earth metal sulfate to alkali metal sulfate in said granular mixture is within the range of 1:2-20:1.

3. The method of claim 1 wherein the molar ratio of said alkaline earth metal sulfate to said alkali metal sulfate is within the range of 1:2-4:1.

4. The process of claim 1 wherein said granular carbonaceous reducing agent is supplied to said reaction zone in an amount to provide at the reaction zone conditions a fixed carbon content of said carbonaceous reducing agent in an amount of at least two moles of fixed carbon per mole of sulfate in said granular mixture.

5. The method of claim 4 wherein said carbonaceous reducing agent is supplied to said reaction zone in an amount to provide 2 to 6 moles of fixed carbon at the reaction zone conditions per mole of sulfate in said granular mixture.

6. The method of claim 1 wherein said granular mixture also contains alkali metal sulfide.

7. The method of claim 6 wherein a portion of the alkali metal sulfide produced within said reaction zone is withdrawn from said reaction zone and recycled to to provide said alkali metal sulfide contained in said granular mixture supplied to said reaction zone.

8. The method of claim 1 wherein the residence time of said granular mixture within said reaction zone is no more than 50 minutes.

9. The method of claim 1 wherein the residence time of said granular mixture within said reaction zone is within the range of 5-25 minutes.

10. The method of claim 1 wherein said alkaline earth metal sulfate is calcium sulfate.

11. The method of claim 1 wherein said alkali metal sulfate is selected from the group consisting of sodium sulfate and potassium sulfate.

12. The method of claim 1 wherein said granular mixture is formed by the steps of compositing said alkaline earth metal sulfate and said alkali metal sulfate in an aqueous medium and thereafter drying said composite and adding said carbonaceous reducing agent to arrive at the granular mixture supplied to said reaction zone.

13. The method of claim 1 wherein said granular mixture is formed by compositing said alkaline earth metal sulfate, said alkali metal sulfate and said carbonaceous reducing agent and thereafter drying said composite.

14. The method of claim 12 wherein said granular mixture is formed by mixing an aqueous solution of said alkali metal sulfate with said alkaline earth metal sulfate and adding said solid carbonaceous reducing agent to form said composite prior to said drying step.

15. The method of claim 14 further comprising the step of withdrawing alkaline earth metal and alkali metal sulfides from said reaction zone and contacting said alkali metal and alkaline earth metal sulfides with an alkaline earth metal sulfate and carbon dioxide in the presence of water to produce an aqueous solution of alkali metal sulfate containing alkaline earth metal carbonate, separating said alkaline earth metal carbonate from said alkali metal sulfate solution, and recycling said alkali metal sulfate solution to provide a source of alkali metal sulfate in said granular mixture.

16. The method of claim 15 further comprising the step subsequent to the separation of said alkaline earth metal carbonate from said alkali metal sulfate solution, evaporating water from said alkali metal sulfate solution to provide a concentrated aqueous solution of alkali metal sulfate and employing said concentrated alkali metal sulfate solution in the formation of said granular mixture.

17. A process for reducing an alkaline earth metal sulfate with the attendant generation of gas, the steps comprising:
(a) formulating a granular mixture of said alkaline earth metal sulfate, a solid carbonaceous material and an alkali metal sulfate;
(b) heating said granular mixture to a temperature sufficient to reduce said alkali metal sulfate to the corresponding alkali metal sulfide which forms a reduced melting point system with said alkali metal sulfate;
(c) maintaining said solid granular mixture at a temperature effective to produce a transitional melt phase at the interface between said alkali metal sulfate and said alkali metal sulfide while maintaining portions of said alkali metal sulfate and said alkali metal sulfide in the solid state and permitting ion exchange between said alkaline earth metal sulfate and said alkali metal sulfide to produce alkaline earth metal sulfide; and
(d) maintaining said transitional melt phase for a time sufficient to produce synthesis gas from said carbonaceous material and convert the predominant amount of said alkaline earth metal sulfate to the corresponding sulfide.

18. The method of claim 17 wherein said alkaline earth metal sulfate is calcium sulfate and said alkali metal sulfate is selected from the group consisting of sodium sulfate and potassium sulfate.

19. The method of claim 18 wherein said alkali metal sulfate is sodium sulfate.

20. A method for reducing calcium sulfate and the attendant gasification of a solid carbonaceous fuel within a continuous reaction furnace, the steps comprising:
(a) formulating a granular mixture of calcium sulfate, at least a portion of the solid carbonaceous fuel supplied to said furnace and an alkali metal sulfate selected from the group consisting of sodium sulfate and potassium sulfate which is subject to reduction to the corresponding alkali metal sulfide to form a reduced melting point system with said alkali metal sulfate;
(b) supplying said granular mixture to said reaction furnace to reduce said alkali metal sulfate to the corresponding alkali metal sulfide with the attendant generation of synthesis gas from said carbonaceous fuel; and
(c) operating said reaction furnace at a temperature greater than the eutectic point of said alkali metal sulfate, alkali metal sulfide reduced melting point system and less than the lower of the melting temperatures of said alkali metal sulfate and said alkali metal sulfide to convert said calcium sulfate to calcium sulfide.

21. The method of claim 20 wherein said alkali metal sulfate is sodium sulfate.

22. The method of claim 21 wherein said furnace is operated at a temperature of greater than 760° C. but no greater than 880° C.

23. The method of claim 21 wherein said reaction furnace is operated at a temperature within the range of 780°-840° C.

24. The method of claim 21 wherein the residence time of said granular mixture within said furnace is within the range of 5-25 minutes.

25. The method of claim 21 wherein the molar ratio of calcium sulfate to sodium sulfate is within the range of 1:2-20:1.

26. The process of claim 25 wherein said carbonaceous fuel is supplied to said furnace in said granular mixture in an amount to provide at the furnace conditions an amount of fixed carbon of at least two moles of fixed carbon per mole of sulfate in said granular mixture.

27. The method of claim 26 wherein the total amount of carbonaceous fuel is supplied to said furnace in an amount to provide at least 10 moles of fixed carbon per mole of sulfate in said granular mixture.

28. The method of claim 27 wherein a portion of said fuel is burned in said furnace and a portion of said fuel is converted to synthesis gas having a hydrocarbon component.

29. The method of claim 21 wherein said granular mixture is formed by the steps of compositing said calcium sulfate and said sodium sulfate in an aqueous medium and thereafter drying said composite and adding said solid carbonaceous reducing agent to arrive at the granular mixture supplied to said furnace.

30. The method of claim 29 wherein said calcium sulfate is phosphogypsum and wherein at least a portion of said aqueous medium is provided by free water derived from the water of hydration of said gypsum upon contact with sodium sulfate.

31. The method of claim 29 wherein said granular mixture is formed by mixing an aqueous solution of sodium sulfate with said calcium sulfate and adding said solid carbonaceous reducing agent prior to said drying step.

32. The method of claim 31 further comprising the step of withdrawing said calcium and sodium sulfides from said furnace and contacting said sulfides with calcium sulfate and carbon dioxide in the presence of water to produce an aqueous solution of sodium sulfate containing calcium carbonate, separating said calcium carbonate from said sodium sulfate solution, and recycling said sodium sulfate solution to provide a source of sodium sulfate in said granular mixture.

33. The method of claim 32 further comprising the step, subsequent to the separation of calcium carbonate from said sodium sulfate solution, of evaporating water from said solution to provide a concentrated aqueous sodium sulfate and employing said concentrated solution in the formation of said granular mixture.

* * * * *

UNITED STATES PATENT AND TRADEMARK OFFICE
CERTIFICATE OF CORRECTION

PATENT NO. : 4,704,136

DATED : November 3, 1987

INVENTOR(S) : Charles W. Weston, et al.

It is certified that error appears in the above-identified patent and that said Letters Patent is hereby corrected as shown below:

Col. 5, line 1, "mSo$_4$" should be --mSO$_4$--.

Col. 9, line 15, "178" should be --1/2--.

Col. 21, line 62, "10$^{31}$ $^3$%" should be --10$^{-3}$%--.

Signed and Sealed this

Seventeenth Day of May, 1988

Attest:

DONALD J. QUIGG

*Attesting Officer*       *Commissioner of Patents and Trademarks*